3,194,633
MANUFACTURE OF LEAD OXIDE HYDROXIDES
Ernst Voss and Alexander Koenig, both of Frankfurt am Main, Germany, assignors to Varta Aktiengesellschaft, Frankfurt am Main, Germany, a corporation of Germany
No Drawing. Filed Dec. 11, 1961, Ser. No. 158,597
Claims priority, application Germany, Dec. 31, 1960, A 36,410
8 Claims. (Cl. 23—146)

The present invention relates to improvements in the manufacture of lead oxide hydroxide represented by the alternative formulas $5PbO \cdot 2H_2O$ or $3PbO \cdot 2Pb(OH)_2$. Lead oxide hydroxide is a useful compound for the preparation of active masses of storage battery plates, as disclosed in our copending application Serial No. 158,599, filed on even date and entitled "Manufacture of Active Mass for Lead-Acid Storage Battery Plates, Active Masses So Produced, and Plates With Such Masses."

Conventionally, lead oxide hydroxide has been produced by dissolving lead acetate in the required amount of cold water and subsequently adjusting the pH-value of the solution with concentrated sodium hydroxide solution until it is weakly alkaline. This produces a precipitate of lead oxide hydroxide as a micro-crystalline, white powder. The precipitate is then suspended three to four times in fresh water and washed on a filter. In this conventional process, about 500 g. of lead oxide hydroxide may be obtained under the best of reaction conditions from 1000 g. of lead acetate.

The lead oxide hydroxide produced according to this process contains traces of acetate ions which are difficult to remove but which should not be present when the lead oxide hydroxide is used in active masses of storage battery plates.

It is accordingly the primary object of the present invention to provide a process wherein lead oxide hydroxide free, or substantially free, of undesired anions is produced.

This and other objects are accomplished in accordance with this invention by precipitating the lead oxide hydroxide from an alkaline plumbite solution by adding to the solution an amount of an acid sufficient to adjust the pH-value of the solution to a pH of about 13.0 to 14.0. It is important to operate at a temperature of the solution not exceeding about 45° C. to 50° C. since, at about that point, the oxide hydroxide is irreversibly converted into rhombic plumbous oxide crystals according to the reaction $$5PbO \cdot 2H_2O \rightarrow 5PbO \text{ (rhomb.)} + 2H_2O$$

The pH-value of the solution must be held at a pH of about 13.0 to 14.0 to avoid the production of basic sulfates, when sulfuric acid is used.

Since the precipitation of the lead oxide hydroxide is practically quantitative if sufficient acid is added, it is possible to work with very dilute alkaline plumbite solutions but, for economic reasons, it is preferred to hold the volume of the solution low, i.e. to operate with concentrated solutions.

The pH adjustment necessary to effect precipitation may be effected with any mineral acid. Preferred are sulfuric acid and such other acids, the alkali salts of which are readily soluble, for instance, sodium and potassium salts, nitric acid or perchloric acid. With these preferred acids, it is possible to obtain an anion free lead oxide hydroxide.

Somewhat diluted acids, such as a 10% to 20% sulfuric acid, are preferred but concentrated acid solutions may also be used if care is taken to remove any resultant reaction heat so that the temperature never substantially exceeds about 45° C. to 50° C.

The following examples illustrate the practice of the invention without in any way limiting the same thereto:

Example 1

65 g. of plumbous oxide (PbO) were dissolved in one liter of 20% sodium hydroxide solution at about 70° C. Any residue was filtered off and the clear solution was cooled to about 30° C. While maintaining the reaction mixture cooled and constantly stirring, 2.1 liter of 10% sulfuric acid were added to lower the pH to about 13.0. White, microcrystalline lead oxide hydroxide was precipitated and the precipitate was thoroughly washed and then filtered. After drying, 60 g. of lead oxide hydroxide were obtained.

Example 2

50 g. lead oxide are dissolved under boiling in one liter of 25% potassium hydroxide. While maintaining the reaction mixture cooled and constantly stirring an addition of 20% perchlorate acid is added to lower the pH to about 13.0. The precipitated lead oxide hydroxide is then filtered and washed.

We claim:

1. The process which comprises adding to an alkaline alkali metal plumbite solution, at a temperature not exceeding about 50° C., and a mineral acid in an amount sufficient to adjust the pH of the solution to within the range of about 13.0 to about 14.0 and recovering the resulting lead oxide hydroxide of the formula $5PbO \cdot 2H_2O$.

2. The process which comprises adding to an alkaline alkali metal plumbite solution, at a temperature not exceeding about 50° C., sulfuric acid in an amount sufficient to adjust the pH of the solution to within the range of about 13.0 to about 14.0 and recovering the resulting lead oxide hydroxide of the formula $5PbO \cdot 2H_2O$.

3. The process which comprises adding to an alkaline alkali metal plumbite solution, at a temperature not exceeding about 50° C., perchloric acid in an amount sufficient to adjust the pH of the solution to within the range of about 13.0 to about 14.0 and recovering the resulting lead oxide hydroxide of the formula $5PbO \cdot 2H_2O$.

4. The process which comprises adding to a sodium plumbite solution, at a temperature not exceeding about 50° C., a mineral acid in an amount sufficient to adjust the pH of the solution to within the range of about 13.0 to about 14.0 and recovering the resulting lead oxide hydroxide of the formula $5PbO \cdot 2H_2O$.

5. The process which comprises adding to an alkaline alkali metal plumbite solution, at a temperature not exceeding about 50° C., and short of that at which the lead oxide hydroxide is converted to rhombic plumbous oxide, a mineral acid in an amount sufficient to adjust the pH of the solution to within the range of about 13.0 to about 14.0 and recovering the resulting lead oxide hydroxide of the formula $5PbO \cdot 2H_2$.

6. The process of preparing lead oxide hydroxide of the formula $5PbO \cdot 2H_2O$ which comprises the step of precipitating lead oxide hydroxide from an alkaline alkali metal plumbite solution by adding to the solution, at a temperature not exceeding about 50° C., an amount of dilute mineral acid sufficient to adjust the pH of the solution to about the range of 13.0 to about 14.0 and recovering the resulting lead oxide hydroxide.

7. The process of claim 6 in which the acid is an acid of which the alkali metal salts are readily water soluble.

8. The process which comprises adding to an alkaline alkali metal plumbite solution, at a temperature not exceeding about 50° C., a mineral acid selected from the group consisting of sulfuric acid and perchloric acid in an amount sufficient to adjust the pH of the solution to within the range of about 13.0 to about 14.0 and recovering the resulting lead oxide hydroxide of the formula $5PbO \cdot 2H_2O$.

References Cited by the Examiner

Mellor:: Comprehensive Treatise on Inorganic and Theoretical Chemistry, Longmans, Green and Co., New York, vol. 7, pages 639 to 643 and 661 to 664 (pages 641, 661, 662 and 663 particularly relied on).

MAURICE A. BRINDISI, *Primary Examiner.*